Jan. 3, 1950 C. F. WOLTERS 2,493,211

INDEX AND SIGNAL

Filed May 17, 1945

Inventor

Carl F. Wolters

By

Attorney

Patented Jan. 3, 1950 2,493,211

UNITED STATES PATENT OFFICE 2,493,211

INDEX AND SIGNAL

Carl F. Wolters, Kenmore, N. Y., assignor to Remington Rand Inc., Buffalo, N. Y., a corporation of Delaware Application May 17, 1945, Serial No. 594,330

9 Claims. (Cl. 129—16.7)

This invention relates to a card index having an index card provided with an adjustable signal. It has particular reference to a card having an attached signal which is readily shiftable along the margin of a card but is securely retained in the position in which it is set against accidental displacement.

It has heretofore been proposed to provide a series of offset overlapping or visible record cards with sheaths or pockets on their exposed margins for receiving tabs or strips of vari-colored material serving as signals for the information placed on the card.

According to the present invention, there is provided a simple and novel combination of record card and index signal, adapted to be mounted in either horizontal or vertical relation in a card index, wherein the customary pocket may be dispensed with if desired, and wherein the signal engages the card in a positive manner securing it from accidental displacement.

The invention provides a signal that is mounted on an index card or folder by direct engagement therewith and at the same time is adjustable to display varying amounts of the signal on one side of the card or folder in providing a signalling operation along a margin of the card or folder. The folder or card and signal are constructed for cooperation to support the signal in any adjusted position on the card or folder against accidental displacement.

The principles of the invention, and the advantages to be gained therefrom, will be apparent from the following description of typical embodiments, illustrated in the accompanying drawings, wherein.

Figures 1, 2, 3, 5:
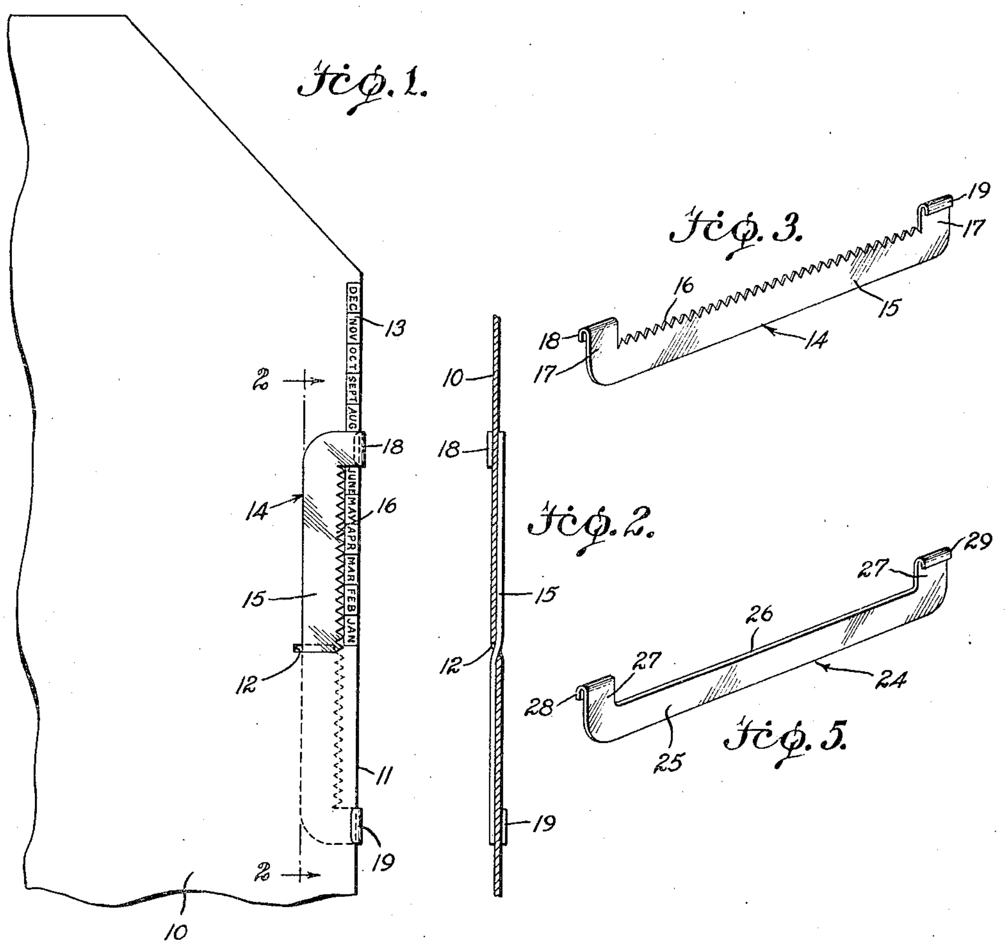
Fig. 1 is a fragmentary elevation of a record card having an adjustable signal mounted on a vertical edge thereof.
Fig. 2 is a section taken along the line 2—2 of Fig. 1.
Fig. 3 is a perspective of the signal element shown in Fig. 1.

As shown in Fig. 1, a record card 10 is provided along one of its vertical edges 11 with a rectangular slot 12 and an index 13 having an origin point at the upper edge of the slot and extending along the vertical margin above the slot in the card. The index 13 is herein shown as a series of continuous blocks marked off into the months of the year, but it will be obvious that any other suitable legends may be applied, as the card may be employed for numerous kinds of statistical information and records. It should also be understood that the card 10 may be either an original record card upon which entries are made directly, or it may be formed with slots to serve as a holder card for an original entry card. Likewise, the card 10 may be provided with legends on both faces, so that signals may be given on either side.

A signal strip 14, shown in perspective in Fig. 3, is adapted to be positioned in the slot 12 in the manner illustrated in Figs. 1 and 2. The signal 14 comprises an elongated body portion 15 of any suitable material, such as clear or colored plastic flexible sheet material, having an overall width slightly less than the length of the slot 12. One edge of the strip may be smooth, but the outer edge 16 is serrated or otherwise formed with numerous projections. While the number may vary, there should be at least as many teeth or projections along the edge 16 as there are index divisions along edge 11, so that the signal may be set in any desired signalling position. It will also be apparent that the spacing between the projections should be such as to enable the strip to be set in various positions corresponding to the spaces along the index 13.

Each end of the strip 14 is provided with an upstanding lug 17, one of which is formed with a rolled lip 18 facing in one direction, while the other is formed with a lip 19 facing in the opposite direction. The width of the lugs 17 is such that they may be passed through the slot 12 when the signal 14 is disengaged from the card 10. Referring particularly to Fig 1, a signal 14 is positioned along the card by slipping one end through the slot 12, flexing the signal and card, and engaging the lips 18 and 19 over the edge 11 from opposite sides of the card, thus causing the signal to be visible in part on each face of the card 10. The height of the lugs 17 is moreover such that, as the lips engage the edge, the signal body 15 is pulled toward the edge 11, thus causing one or more of the teeth along the edge 16 to lock into the corners of the slot 12. It will be seen that, since the body portion 15 is of slightly less width than the length of the slot, and the lugs 17 are slightly shortened with respect to the distance from the slot to the edge 11, the edge 16 is pulled up against the outer edge of the slot, thus binding and holding the signal in adjusted position.

When the serrated form of signal shown in

Fig. 3 is employed, the projections provide a very positive type of connection between the signal and card, and thus safeguard against slippage or accidental displacement even when the card 10 is mounted with the index 13 along a vertically disposed edge. The signal may nevertheless be readily moved along the card simply by flexing the parts to release the abutting edges of the body 15 and the slot 12, or by releasing one of the lips 18 or 19, as desired. The lug 17 on the exposed face of the card also serves as the indexing tab for the index 13, while the concealed lug 17 may be employed for a similar purpose on the back of the card if front and back indicia are provided.

It is preferable to form the slot 12 as an aperture having a continuous wall, rather than as a slit extending inwardly from the edge of the card, although for some purposes an angularly directed slit could be incorporated without departure from the spirit of the invention. With the construction as shown, however, the signal 14 is securely positioned throughout its entire length with respect to the margin of the card, and accordingly the tilting or jumping of the signal, as has been heretofore encountered in some types of signal devices, is prevented. Because of the positive engagement, no sheath or pocket is required in so far as the signal itself is concerned.

Figure 4:
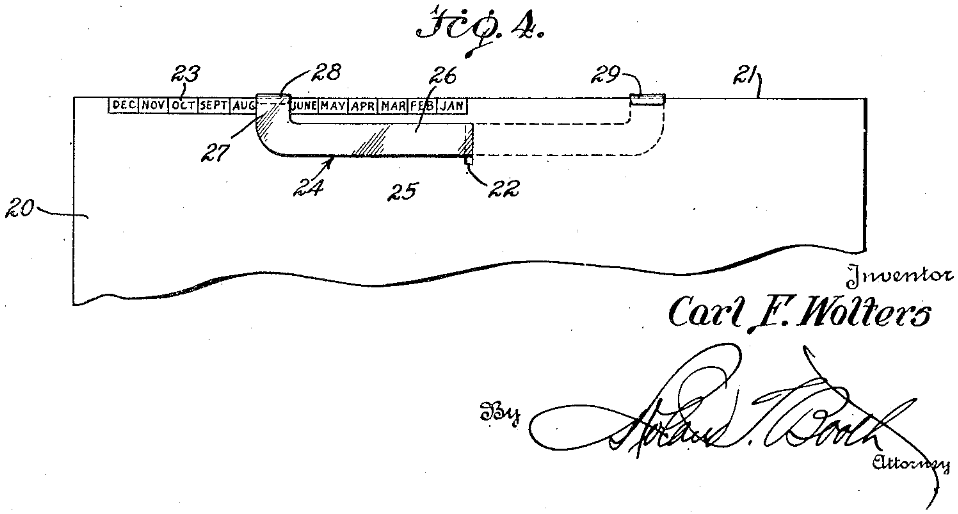
Fig. 4 is a fragmentary elevation of a record card having a modified form of signal element mounted along a horizontal edge; and, Fig. 5 is a perspective of the modified signal element.

The embodiment of the invention illustrated in Figs. 4 and 5 is quite similar to that just described, and accordingly comparable reference numerals have been employed for related parts. The card 20 is herein shown, however, as carrying an index 23 along a horizontal edge 21, which of course may be either the upper or lower edge, as the card may be turned in any direction without dislodging the signal 24. The signal body 25 terminates at each end in lugs 27 provided with reversely directed lips 28 and 29, and it is inserted in the card slot 22 as previously explained. However, the upper edge 26 of the signal 24 is made perfectly smooth, instead of being formed with projections, inasmuch as there is less likelihood of slippage when the card is mounted with its index along a horizontal edge. Accordingly, the frictional engagement between the edge 26 and the slot 22 may be relied upon to overcome accidental displacement.

The paper stock or other material for the card 10 or 20 may be of the same weight and quality as that heretofore found acceptable for articles of this nature. While experience has not revealed any chafing or cutting of the locking edge of the slot 12 or 22 by the signal, it is obvious that the wall of the slot may be reinforced, if the material itself does not have sufficient toughness.

The signals above described and shown in the drawings may be mounted on the margin of a card, sheet or folder of any kind now used and well known for cooperation with an index on said margin. The position of the signal may be readily adjusted along the margin to expose a larger or smaller portion of the signal over the margin of the card on one side and thereby secure an efficient signalling of the desired information by the variation in the length of the exposed portion of the signal.

The invention claimed is:

1. An index comprising a card formed with a slot adjacent but spaced from an edge thereof, an index on the margin of said card between the edge and said slot, and a signal positioned through the slot and having body portions disposed against opposite faces of the card in spaced relation inwardly of said edge and margin, said signal being formed with lateral extensions terminating in lips engaging the edge of the card and facing in opposite directions.

2. An index comprising a card formed with a slot spaced inwardly from an edge thereof, and a signal positioned in the slot and having body portions disposed against opposite faces of the card, said body portions having lips extending laterally and facing in opposite directions for embracing the edge of the card, said lips being positioned on the signal for holding an edge of the signal under tension against a wall of the slot, said signal being movable through the slot to vary the length of the portions thereof overlying the margin of the card on opposite sides.

3. An index comprising a card formed with a slot spaced inwardly from one edge thereof, an index on the margin of said card between said slot and edge, said slot having a continuous wall, a signal comprising a straight-edged flexible strip extending through the slot parallel to said edge, and having an edge engaging the wall adjacent said margin, and lug portions on opposite ends of the signal formed for overlapping said edge of the card and retaining said signal in engagement with said wall.

4. An index comprising a card formed with a rectangular slot adjacent an edge thereof, a signal having a body portion extending through the slot and disposed against opposite faces of the card, lugs formed on the ends of the signal extending to the edge of the card, said lugs being formed with oppositely facing lips overlapping and engaging the edge of the card, the dimensions of the lugs being such that they may be freely passed through the slot and tension the body portion against a wall of the slot when the lips are in card edge engaging position.

5. An index comprising a card formed with a slot adjacent but spaced from an edge thereof, and a signal positioned in said slot, said signal having a body portion disposed through the slot against opposite faces of the card and lugs at the ends of the body portion extending to the adjacent edge of the card, said lugs terminating in oppositely facing lips overlapping the edge of the card, the width of the body portion being less than the length of the slot and the height of the lugs being such that upon engagement of the lips with said edge the body portion is drawn into engagement with a wall of the slot.

6. An index comprising a card formed with a slot adjacent an edge thereof, and a signal positioned in the slot, said signal having a body portion and lugs adapted to engage the edge of the card, said body portion being formed with serrations adapted to engage one wall of the slot.

7. An index comprising a card formed with a slot spaced inwardly from an edge thereof, and a signal formed of an elongated strip positioned in said slot and movable along the card parallel to the margin of said card between said slot and edge, opposite ends of said signal projecting in opposite directions from said slot over opposite faces of the card adjacent said margin, and lugs at the ends of said strip extending laterally therefrom over said margin to the adjacent edge of said card, said lugs being formed at the ends with oppositely facing lips overlapping and engaging the edge of said card for slidably retaining said signal on said card, said signal and card having cooperative engagement therebetween for retaining said signal in adjusted position along a margin of said card.

8. A signal for an index comprising an elongated strip of flexible material having a body portion formed at opposite ends with lugs extending laterally from one edge of the strip and lying in the same plane with the body portion, overturned lips formed at the ends of said lugs in spaced relation from the edge of said body portion, said lips extending in opposite directions relative to the plane of said strip.

9. A signal as claimed in claim 8 wherein the edge of said body portion at the side from which said lugs extend is serrated to form a plurality of projections.

CARL F. WOLTERS.

REFERENCES CITED

The following references are of record in the file of this patent:

UNITED STATES PATENTS

| Number | Name | Date |
|---|---|---|
| 1,876,236 | Jackson | Sept. 6, 1932 |
| 1,898,862 | Walker | Feb. 21, 1933 |
| 2,297,682 | Attwood | Oct. 6, 1942 |